(12) United States Patent
Shutt et al.

(10) Patent No.: US 8,819,708 B2
(45) Date of Patent: Aug. 26, 2014

(54) SYSTEM AND METHOD TO ABSTRACT HARDWARE ROUTING VIA A CORRELATABLE IDENTIFIER

(75) Inventors: Mark W. Shutt, Austin, TX (US); Anand P. Joshi, Round Rock, TX (US); Austin Bolen, Austin, TX (US); Patrick O. Boyd, Round Rock, TX (US); Samer El Haj Mahmoud, Austin, TX (US); William C. Edwards, III, Round Rock, TX (US)

(73) Assignee: Dell Products, LP, Round Rock, TX (US)

( * ) Notice: Subject to any disclaimer, the term of this patent is extended or adjusted under 35 U.S.C. 154(b) by 282 days.

(21) Appl. No.: 12/987,657

(22) Filed: Jan. 10, 2011

(65) Prior Publication Data

US 2012/0180076 A1    Jul. 12, 2012

(51) Int. Cl.
*G06F 3/00* (2006.01)
*G06F 9/44* (2006.01)
*G06F 9/46* (2006.01)
*G06F 13/00* (2006.01)

(52) U.S. Cl.
USPC .......................................................... 719/327

(58) Field of Classification Search
USPC .......................................................... 719/327
See application file for complete search history.

(56) References Cited

U.S. PATENT DOCUMENTS

| | | | |
|---|---|---|---|
| 7,711,758 B1 * | 5/2010 | Gillespie | 707/812 |
| 2005/0015430 A1 * | 1/2005 | Rothman et al. | 709/201 |
| 2006/0168376 A1 * | 7/2006 | Ilyasov | 710/67 |
| 2008/0016143 A1 | 1/2008 | Bumpus et al. | |
| 2008/0091746 A1 * | 4/2008 | Hatasaki et al. | 707/204 |

OTHER PUBLICATIONS

DTMF Technologies Overview, J. Hilland, 2006, http://www.snia.org/events/storage-developer2007/presentations/JHilland_DMTF_Technologies_Overview.pdf.
"RFC-0043: Unique ID for Any Object," F.B. Botelho, Xaraya Development Group, Mar. 2003, © The Digital Development Foundation (2003); http://www.xaraya.com/documentation/rfcs/rfc0043.html.

* cited by examiner

*Primary Examiner* — Andy Ho
*Assistant Examiner* — Timothy A Mudrick
(74) *Attorney, Agent, or Firm* — Larson Newman, LLP

(57) ABSTRACT

An information handling system includes a firmware management infrastructure. The firmware management infrastructure includes a database that identifies a correspondence between members of a set of device paths and members of a set of correlatable identifier strings. A device path represents a platform-specific reference to an object at the information handling system and a correlatable identifier string represents a platform independent reference to the object. Programs can access the database using an application programming interface.

20 Claims, 6 Drawing Sheets

SYSTEM AND METHOD TO ABSTRACT HARDWARE ROUTING VIA A CORRELATABLE IDENTIFIER

FIELD OF THE DISCLOSURE

This disclosure generally relates to information handling systems, and more particularly relates to a system and a method for managing components of an information handling system.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Initialization, operation, and administration of information handling systems have historically been managed using proprietary software and devices. For example, when an information handling system is turned on, a processor device may execute program instructions associated with a basic input/output system (BIOS). These instructions may incrementally activate hardware and software subsystems that collectively make up the information handling system, and ultimately pass control of the information handling system to an operating system (OS). These subsystems may include internal communication channels, network interface controllers, memory devices, and the like. Subsystems may incorporate embedded firmware that can be executed to facilitate initialization of the respective subsystem. The combination of proprietary and ad-hoc subsystem architectures and protocols can make configuration and administration of the information handling system difficult. For example, administration procedures associated with a particular information handling system may vary based on the specific model, the manufacturer, and the individual configuration of the system.

BRIEF DESCRIPTION OF THE DRAWINGS

Embodiments incorporating teachings of the present disclosure are shown and described with respect to the drawings presented herein, in which.

The use of the same reference symbols in different drawings indicates similar or identical items.

DETAILED DESCRIPTION

The following description in combination with the Figures is provided to assist in understanding the teachings disclosed herein. The following discussion will focus on specific implementations and embodiments of the teachings. This focus is provided to assist in describing the teachings and should not be interpreted as a limitation on the scope or applicability of the teachings. However, other teachings can certainly be utilized in this application.

Figure 1:
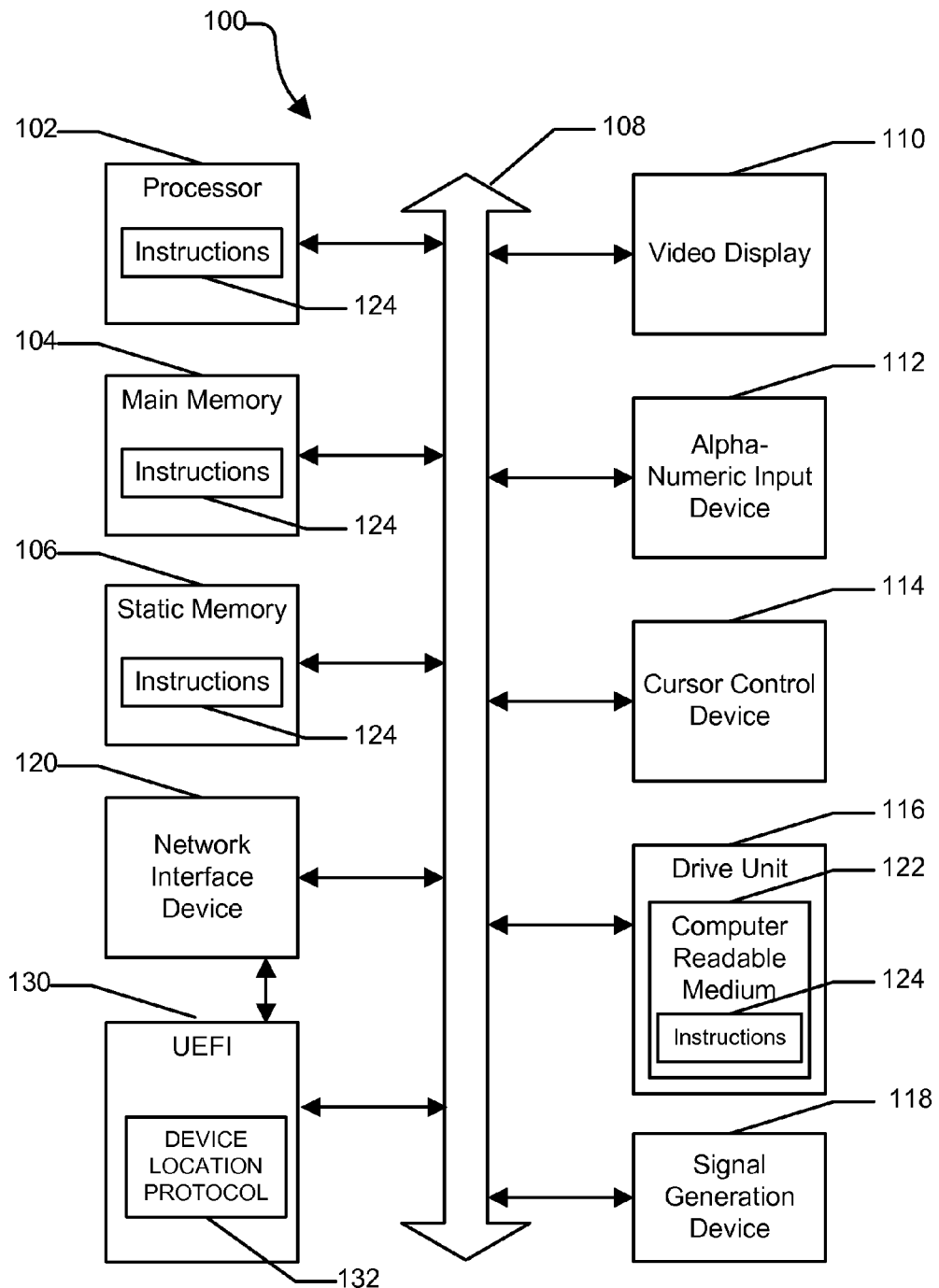
FIG. 1 is a block diagram illustrating an information handling system including a Unified Extensible Firmware Interface (UEFI) including a device location protocol in accordance with a specific embodiment of the present disclosure.

FIG. 1 shows an information handling system 100 including a device location protocol 132 in accordance with a specific embodiment of the present disclosure. The information handling system 100 may include a processor 102 such as a central processing unit (CPU), a graphics processing unit (GPU), or both. Moreover, the information handling system 100 can include a main memory 104 and a static memory 106 that can communicate with each other via a bus 108. As shown, the information handling system 100 may further include a video display unit 110, such as a liquid crystal display (LCD), an organic light emitting diode (OLED), a flat panel display, a solid state display, or a cathode ray tube (CRT). Additionally, the information handling system 100 may include an input device 112, such as a keyboard, and a cursor control device 114, such as a mouse. The information handling system 100 can also include a disk drive unit 116, a signal generation device 118, such as a speaker or remote control, and a network interface device 120. The information handling system may also include additional buses operable to transmit information between the various hardware components, and may include additional storage devices, such as non volatile memory devices. The information handling system 100 can include a service processor (not shown) to enable remote monitoring and management of aspects of the information handling system 100.

For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price.

The information handling system 100 is substantially compliant with one or more revisions of the Unified Extensible Firmware Interface (UEFI) specification. The information handling system 100 includes a UEFI 130 that is similar to, and substantially replaces, the antiquated basic input/output system (BIOS) found in some older information handling systems. The UEFI specification provides standard interfaces and interoperability guidelines for devices that together make up an information handling system. In particular, the UEFI specification describes an interface between an operating system and platform firmware, including data structures and protocols to manage initialization of devices, booting of platform resources, and passing of control to the operating system.

The UEFI 130 also provides protocols and data structures for managing configuration of devices and other objects included at an information handling system. For example, the UEFI 130 includes Human Interface Infrastructure (HII) and associated HII database (not shown). A description of one embodiment of the UEFI HII database may be found in U.S. patent application Ser. No. 12/955,492 and U.S. patent application Ser. No. 12/955,493, the disclosures of which are hereby incorporated by reference. Some aspects of the UEFI specification retain the legacy abbreviation EFI as part of the present nomenclature, however EFI and UEFI are substantially synonymous, and the term UEFI is used herein.

The UEFI specification allows for the extension of platform firmware by loading UEFI driver and UEFI application images. For example, an original equipment manufacturer can include customized or proprietary images to provide enhanced control and management of the information handling system 100. The information handling system 100 includes a device location protocol (DLP) 132, which can be implemented using a UEFI image. The DLP 132 generally provides a lookup table and interface through which another driver or application program can identify devices included at an information handling system using a platform-independent identifier. The operation of the DLP 132 is described further hereinto below.

The UEFI specification identifies devices installed at a UEFI compliant information handling system using a UEFI device path. A UEFI compliant information handling system, such as the information handling system 100, can use a UEFI device path to associate an installed device with a corresponding firmware driver and with respective configuration information. The UEFI device path associated with an instance of a particular device installed at a platform is platform-specific, meaning that the UEFI device path assigned to an instance of the device can vary from one platform to another. The DLP 132 is configured to provide a platform-independent identifier for referring to a specific instance of a device installed at an information handling system. The platform-independent identifier is unique despite variations in the platform, such as the configuration, make, and model of the information handling system. The unique and platform-independent identifier is herein referred to as a correlatable identifier. The DLP 132 can provide a mapping between these identifiers and corresponding UEFI device paths. A correlatable identifier can be implemented as a string, and the term correlatable identifier and correlatable identifier string may be used synonymously. As used herein, a correlatable identifier is considered to be platform-independent because the same correlatable identifier can be used to identify an instance of a particular device included at any of a set of information handling systems. A device path, such as a UEFI device path, is considered to be platform-specific because the device path corresponding to each instance of a particular device can be different from one individual system to another.

In an embodiment, the DLP 132 provides an application programming interface (API) to abstract hardware routing via a correlatable identifier. For example, the DLP 132 can provide a mapping between a UEFI device path and a correlatable identifier. In an embodiment, a correlatable identifier can include a fully qualified device descriptor (FQDD). In particular, the DLP 132 can provide a UEFI device path in response to receiving a correlatable identifier, or alternatively, can provide a correlatable identifier in response to receiving a UEFI device path. In addition, a displayable text string corresponding to the object also can be returned in response to either inquiry. Other drivers and application programs can use the API provided by the DLP 132 for mapping between a UEFI device path and a corresponding correlatable identifier. In an embodiment, the DLP 132 can be active only while the information handling system 100 is booting. In another embodiment, the DLP 132 can remain resident after the boot process has completed. A person skilled in the art will appreciate that the disclosed techniques are not limited to a UEFI environment but can be readily integrated within another type of firmware or system management infrastructure capable of supporting executable software programs. However, a UEFI compliant information handling system provides a convenient context in which to describe the features and operation of the DLP 132.

A driver or application program can use the DLP 132 and techniques described herein to discover devices included within an information handling system in a systematic manner without prior knowledge of specific devices and subsystems included at the system and without prior knowledge about specific architectural nuances of the system. For example, a driver or application program can perform an inventory of devices installed at an information handling system and configure the operating characteristics of the identified devices by referring to each device using a platform-independent correlatable identifier. The driver or program can use the API included at the DLP 132 to determine a platform-specific UEFI device path corresponding to each correlatable identifier.

The DLP 132 can be implemented as a UEFI driver, such as a UEFI boot services driver. Other drivers and applications within the UEFI environment can therefore access the DLP 132 while the information handling system is undergoing a booting procedure. A UEFI boot services driver is an example of a UEFI image. UEFI images are a class of files defined by the UEFI specification that contain executable code. Other images include UEFI applications and UEFI runtime services drivers. UEFI drivers are loaded by a Boot Manager, firmware conforming to the UEFI specification, or by other UEFI applications. UEFI boot services, in particular, provide interfaces for devices and system functionality that can be used during boot time, and are terminated once the operating system takes control of the platform. The UEFI architecture provides that access to devices be abstracted through the use of "handles" and "protocols." Protocols define how to access a certain type of device during boot services. Each protocol is accessible through the device's handle. The UEFI device path protocol can be used on any device handle to obtain generic path/location information concerning the physical device or logical device. In other words, the device path describes the location of the device represented by the handle.

A UEFI Device Path is a variable-length binary data structure that is composed of a series of variable-length generic Device Path Nodes and is used to define a programmatic path to a logical or physical device. The primary purpose of a device path is to allow an application, such as an OS loader, to determine the physical device that the interfaces are abstracting. A collection of device paths is typically referred to as a name space. A UEFI device path can include a Hardware Device Path, an Advanced Configuration and Power Interface Specification (ACPI) Device Path, a Messaging Device Path, a Media Device Path, a Boot Specification Device Path, and an End of Hardware Device Path. For example, a Hardware Device Path defines how a hardware device is attached to the resource domain of a system, such as shared memory, memory mapped input-output (I/O), and the like.

A device path protocol can be used during boot services to provide the information needed to construct and manage device paths. A device handle points to a list of one or more protocols that can respond to requests for services for a given device referred to by the handle. UEFI data structures associated with devices at an information handling system, including UEFI device paths, are determined during installation of the devices and initiation of the system. Accordingly, UEFI device paths are generally unique for any particular platform implementation, and nearly certainly unique to a particular original equipment manufacturer (OEM). Therefore, device path nomenclature utilized by one driver for referring to a device may not be meaningful to another driver or application. The ACPI device path is used to describe devices whose enumeration is not described in an industry-standard fashion, and provides a limited interface between an ACPI-compliant operating system and system firmware in a platform-independent manner. The ACPI name space was designed for usage at operating system runtime and is not suitable for supporting platform firmware or OS loaders. Given this, UEFI defines its own name space, the UEFI Device Path.

Figure 2:
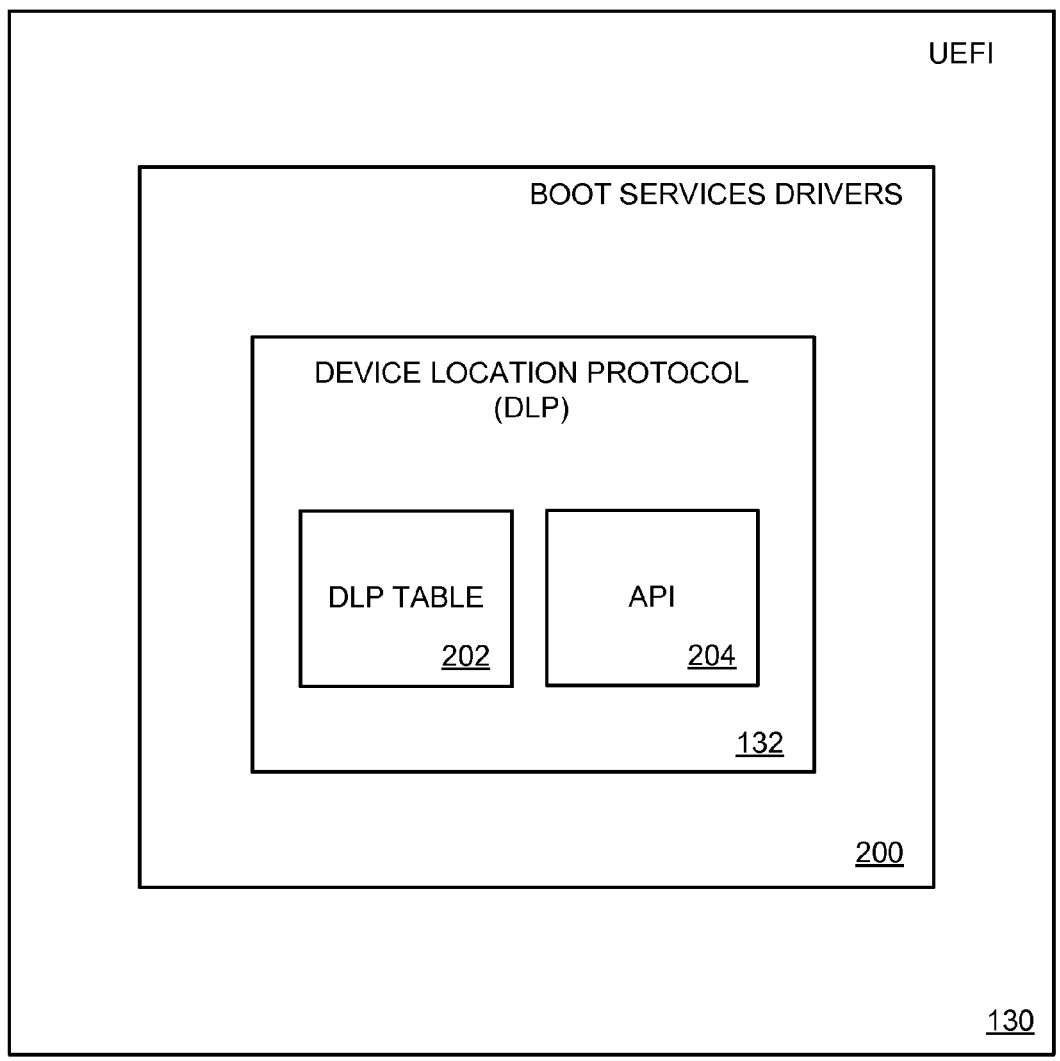
FIG. 2 is a block diagram of the UEFI of FIG. 1 in accordance with a specific embodiment of the present disclosure.

FIG. 2 shows the UEFI 130 of FIG. 1 in accordance with a specific embodiment of the present disclosure. The UEFI 130 includes executable images including boot services drivers 200, which includes the DLP driver 132. The DLP 132 includes a DLP table 202 and an API 204. The DLP 132, and the DLP table 202 in particular, can provide a mapping between each member of a set of device paths and a corresponding member of a set of correlatable identifier strings, as well as to a corresponding member of a set of displayable text strings. Furthermore the DLP 132, and the API 204 in particular, provides an interface through which another driver or application can present an inquiry regarding a device. The API 204 can respond to the inquiry based on information stored at the DLP table 202.

The DLP 132 can be implemented as a UEFI boot services device driver, which can be executed and remain resident in memory while the information handling system is proceeding through a booting procedure. During the booting procedure, components of the system are initialized and placed into service. Execution of boot services drivers 200 are terminated when control of the information handling system 100 is transferred to an operating system. A device driver, such as the DLP 132, can install additional protocol interfaces on an existing device handle. For example, a physical device handle includes a Device Path Protocol. A UEFI boot manager, which is a firmware policy engine, loads the UEFI boot services drivers 200. Accordingly, the DLP 132 can be loaded by the boot manager as directed by a boot order list, read from a globally defined NVRAM variable.

The DLP table 202 can be implemented as a database, a hash, or another type of data structure for maintaining a relationship between elements included at the DLP table. Other drivers and applications can query the DLP table 202 using the API 204. The DLP table can include entries for all devices having a UEFI device path that are included at an information handling system. In an embodiment, the DLP 132 can be extended to provide information regarding devices such as power supplies, fans, central processing units, memory devices, external memory devices, and the like. For example, the DLP 132 can call one or more extended protocols if the DLP 132 is not able to satisfy a query using the DLP table 202.

A UEFI device path includes a node-based syntax that is known to persons skilled in the art and readers are referred to the UEFI specification and supporting documentation for further information regarding UEFI device paths. A correlatable identifier can include a standard or proprietary string that provides a platform independent description of the device associated with a corresponding UEFI device path. In an embodiment, a correlatable identifier can include a fully qualified device descriptor (FQDD). For example, a correlatable identifier representing a specific network interface card (NIC) can be represented by the string:

"Nic.Embedded.1"

This correlatable identifier can be used to refer to this particular NIC installed at any DLP-equipped information handling system independent of how the system is individually configured. In other words, a correlatable identifier provides a platform-independent descriptor by which the associated device can be referenced.

The DLP table 202 can associate this correlatable identifier with a corresponding UEFI device path, wherein the device path may be unique for each platform implementation containing the NIC device. The DLP table 202 also can provide a displayable text string corresponding to the device path and to the associated device path, such as:

"DELL standard embedded network interface slot 1"

The displayable text string can include information regarding a physical location of the device at an information handling system, such as "slot 1" in the present example, device identification information, such as a model number or a serial number, and the like. For example, in the event of a device error during a boot process, a displayable text string and/or a correlatable identifier associated with the failing device can be included with an error message and presented at a display device or written to a file.

The UEFI 130 includes other executable images (not shown) as defined by the UEFI specification. For example, the UEFI 130 can include an HII database and corresponding protocols to support the storage and manipulation of configuration information associated with UEFI compliant physical and logical devices included at the information handling system 100. The UEFI specification provides a standardized way in which firmware can communicate with a user or application software concerning firmware related settings. Each configuration setting can be associated with an HII question. An HII question is a type of HII statement that has a value, and the value corresponds to a configuration setting for the information handling system. A form, included at a forms package, may present one or more questions and an interface though which a user or an application program can select between a set of provided configuration options. For example, an HII question may represent an option to enable or disable a Universal Serial Bus (USB) port. HII questions are uniquely identified within an HII form set using a respective sixteen-bit Question Identifier. The Question Identifier, along with a UEFI Device Path, and a Form Set Identifier (typically a globally unique identifier (GUID)), uniquely identifies a configuration setting within the information handling system. This set of identifiers is suitable for use by the UEFI 130 to administer device configuration options.

Figure 3:
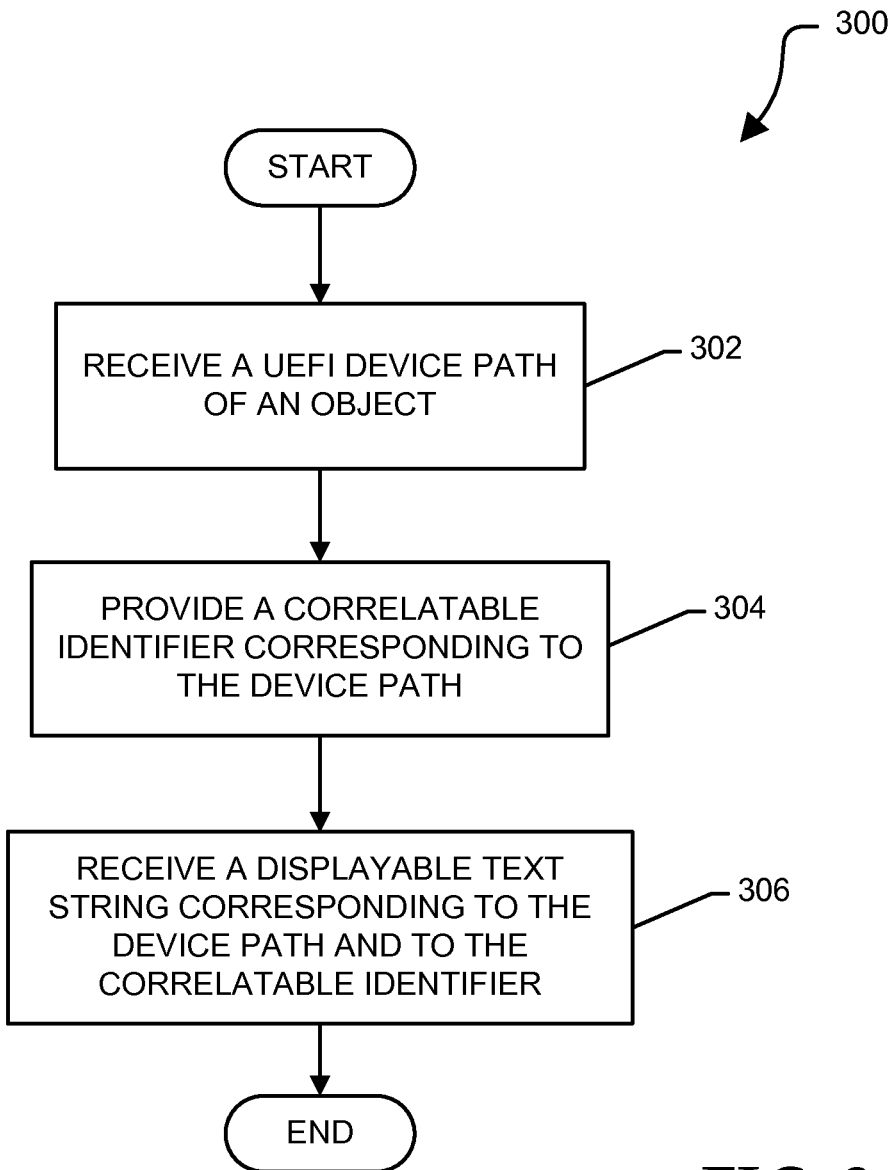
FIG. 3 is a flow diagram illustrating a method for determining a platform independent identifier based on a device path, such as a UEFI device path, in accordance with a specific embodiment of the present disclosure.

FIG. 3 shows a flow diagram 300 illustrating a method for determining a platform independent identifier based on a device path, such as a UEFI device path. The method begins at block 302 where a driver or application program provides a UEFI device path associated with an object at an information handling system to an API, such as the API 204 provided by the DLP 132. The flow proceeds to block 304 where the DLP 132 responds by providing a correlatable identifier corresponding to the device path. The flow proceeds to block 306 where the DLP 132 can optionally respond with additional information, such as a displayable text string associated with the device path and to the correlatable device path. For example, the DLP 132 can access the DLP table 202 using the received UEFI device path as an input parameter, and extract a correlatable identifier and a displayable text string from the table corresponding to the device path.

Figure 4:
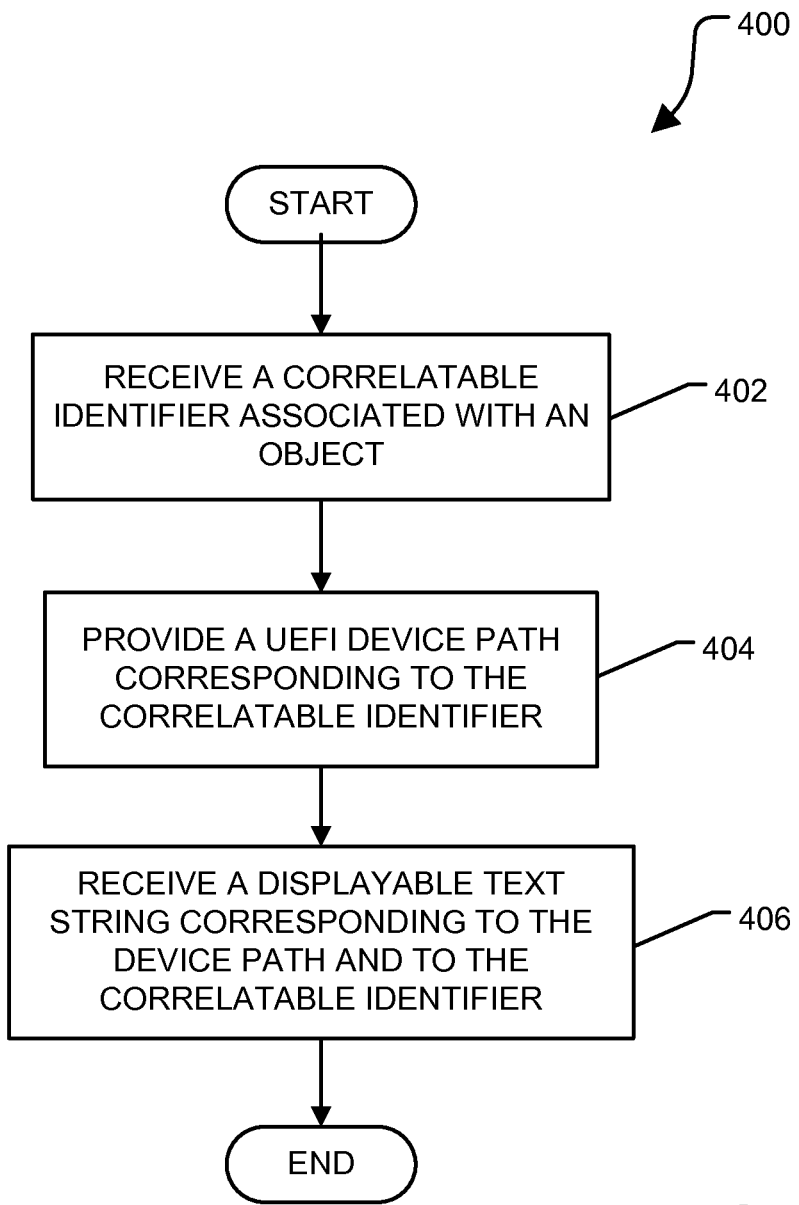
FIG. 4 is a flow diagram illustrating a method for determining a UEFI device path based on a correlatable identifier in accordance with a specific embodiment of the present disclosure.

FIG. 4 shows a flow diagram 400 illustrating a method for determining a UEFI device path based on a correlatable identifier in accordance with a specific embodiment of the present disclosure. The method begins at block 402 where a driver or application program provides a correlatable identifier associated with an object at an information handling system to an API, such as the API 204 provided by the DLP 132. The flow proceeds to block 404 where the DLP 132 responds by providing a UEFI device path corresponding to the correlatable identifier. The flow proceeds to block 406 where the DLP 132 can optionally respond with additional information, such as a displayable text string associated with the device path and to the correlatable device path. For example, the DLP 132 can access the DLP table 202 using the received correlatable identifier as an input parameter, and extract a UEFI device path and a displayable text string from the table corresponding to the correlatable identifier.

Figure 5:
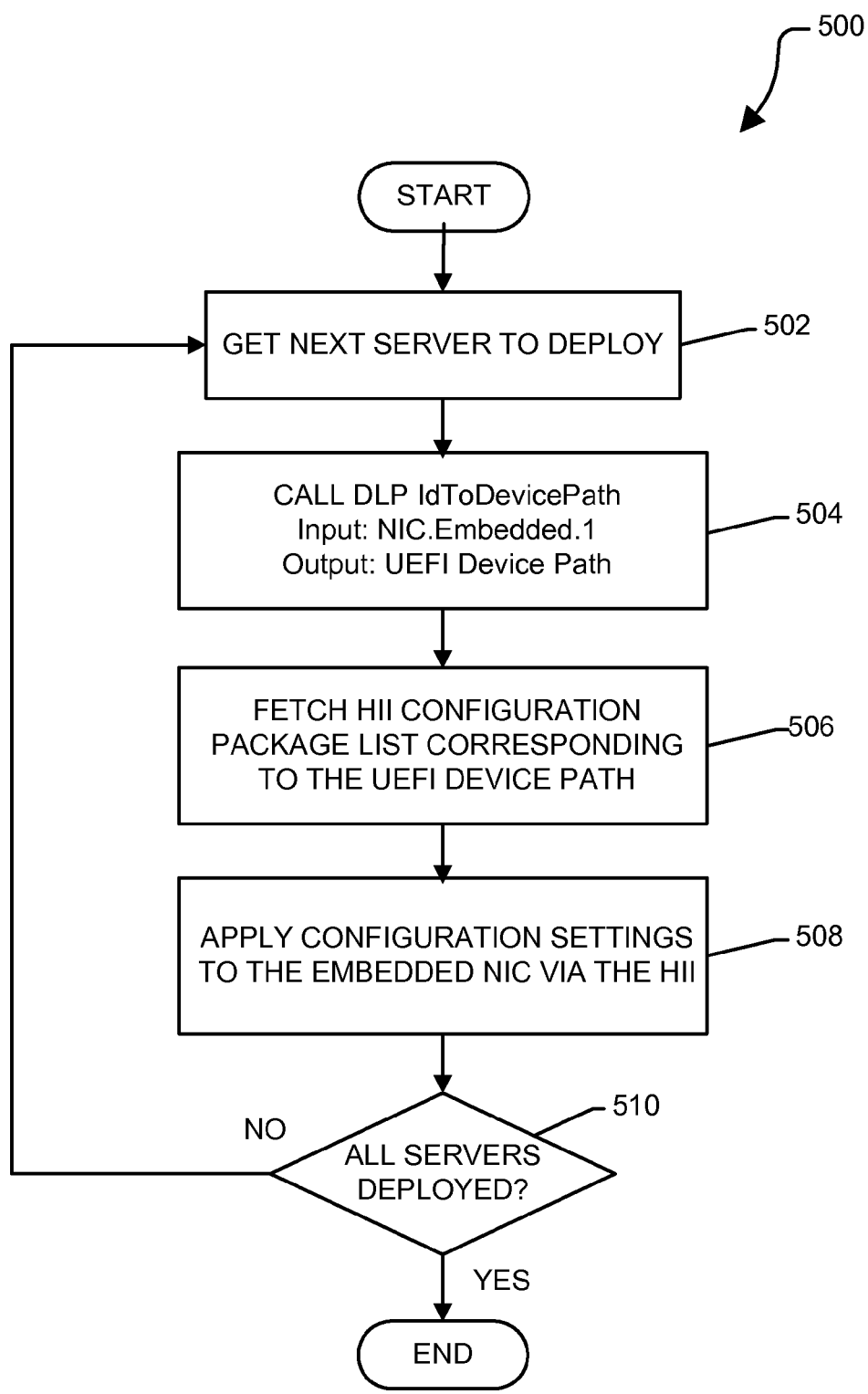
FIG. 5 is a flow diagram illustrating a method for managing server deployment based on the method of FIG. 4.

FIG. 5 shows a flow diagram 500 illustrating a method for managing server deployment based on the method of FIG. 4. In particular, the method illustrates use of a DLP, such as the DLP 132, during configuration of operating characteristics of a network interface card (NIC) installed at each of a plurality of disparate servers. For example, individual servers may vary in specific platform configuration, by model, or even by manufacturer. A UEFI system will load a UEFI driver associated with each NIC during boot time. However, a UEFI device path associated with the NIC may be unique for each server due to the variations in their individual configuration. Accordingly, each of the servers can include a DLP. A configuration program can utilize the API 204 provided by the DLP 132 to determine a UEFI device path that is specific to each server based on a platform-independent correlatable identifier associated with the NIC. The configuration program can access and modify UEFI HII configuration information using the UEFI device path provided by the DLP 132.

The method begins at block 502 where a server is selected for configuration and deployment. For example, a technician may be installing a number of new computer systems at a data processing center, and each system is to be configured appropriately. The flow proceeds to block 504 where a configuration program issues a call to a DLP API routine, IdToDevicePath, and provides an input argument consisting of a correlatable identifier, "NIC.embedded.1." The IdToDevicePath routine performs a query at the DLP table 202 of the DLP 132 and returns a UEFI device path corresponding to the correlatable identifier. The flow proceeds to block 506 where the configuration program uses a UEFI protocol to fetch an HII configuration package list corresponding to the UEFI device path determined at block 504. The flow proceeds to block 508 where configuration program configures the embedded NIC using the HII protocols provided by the UEFI. The flow proceeds to decision block 510 where it is determined whether additional servers to be deployed. If further servers remain to be deployed, the flow returns to block 502. If all servers have been deployed and configured, the flow is terminated.

Figure 6:
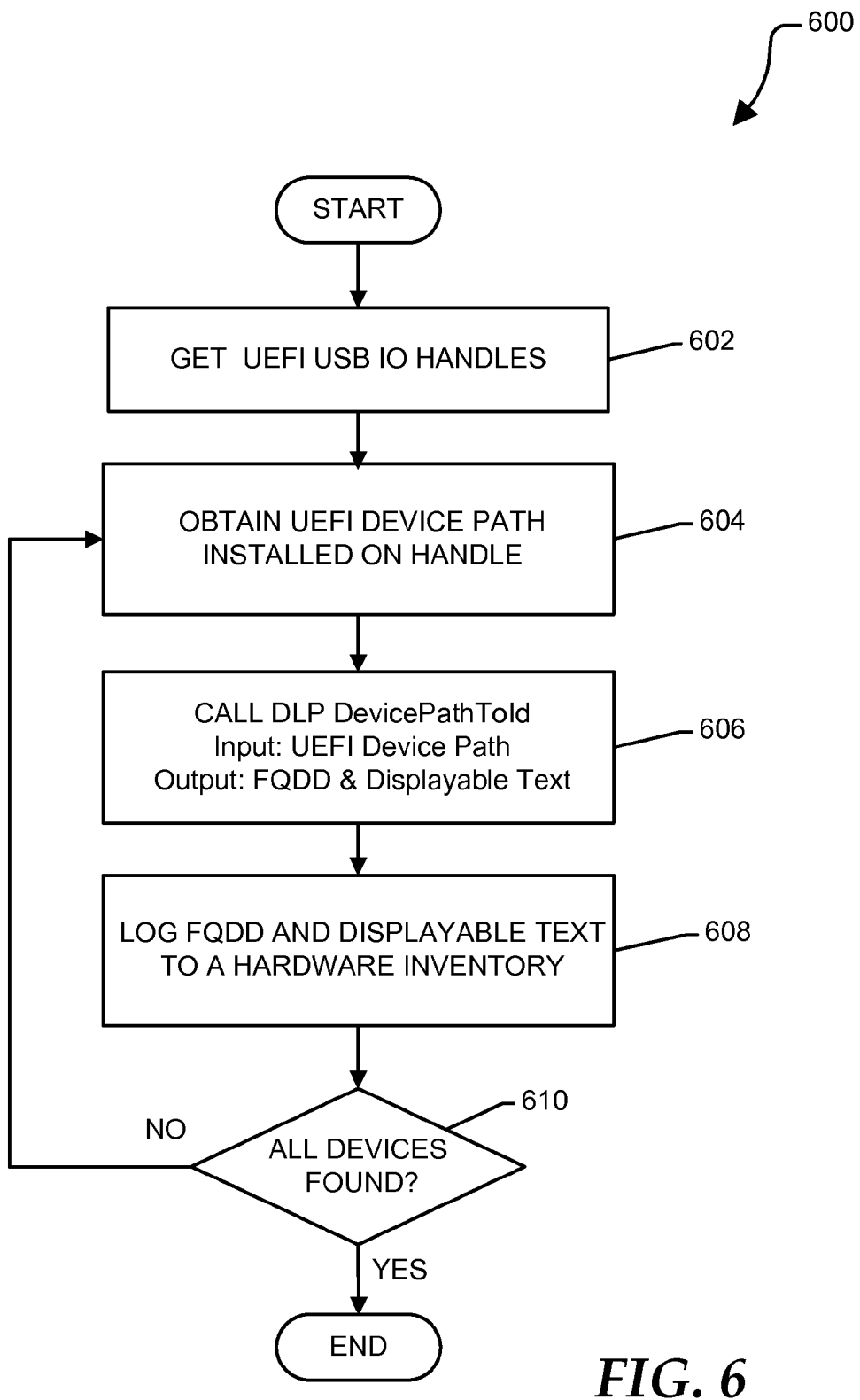
FIG. 6 is a flow diagram illustrating a method for conducting an inventory of a server based on the method of FIG. 3.

FIG. 6 shows a flow diagram 600 illustrating a method for conducting an inventory of a server based on the method of FIG. 3. In particular, the method illustrates use of a DLP, such as the DLP 132, to determine a correlatable identifier associated with each universal serial bus (USB) device included at a server. The flow begins at block 602 where an inventory program utilizes a UEFI handle protocol to identify a handle associated with a USB device. The flow proceeds to block 604 where another UEFI protocol provides a UEFI device path corresponding to the identified handle. The flow proceeds to block 606 where the inventory program issues a call to a DLP API routine, DevicePathToID, and provides an input argument consisting of a UEFI device path. The DevicePathToId routine performs a query at the DLP table 202 and returns a correlatable identifier consisting of a FQDD corresponding to the specified device path. The DLP 132 also provides the inventory program with a displayable text string associated with UEFI device path and with the correlatable identifier. The flow proceeds to block 608 where the inventory program enters the received FQDD and displayable text string into a hardware inventory. The flow proceeds to a decision block 610 where it is determined whether additional USB devices remain to be inventoried. If additional devices handles have yet to be processed, the flow returns to block 604 where the next handle is processed. If all USB devices have been logged, the flow terminates.

Referring back to FIG. 1, the information handling system 100 can include a set of instructions that can be executed to cause the computer system to perform any one or more of the methods or computer based functions disclosed herein. The computer system 600 may operate as a standalone device or may be connected to other computer systems or peripheral devices, such as by a network.

In a networked deployment, the information handling system 100 may operate in the capacity of a server or as a client user computer in a server-client user network environment, or as a peer computer system in a peer-to-peer (or distributed) network environment. The information handling system 100 can also be implemented as or incorporated into various devices, such as a personal computer (PC), a tablet PC, a set-top box (STB), a personal digital assistant (PDA), a mobile device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any other machine capable of executing a set of instructions (sequential or otherwise) that specify actions to be taken by that machine. In a particular embodiment, the computer system 600 can be implemented using electronic devices that provide voice, video or data communication. Further, while a single information handling system 100 is illustrated, the term "system" shall also be taken to include any collection of systems or sub-systems that individually or jointly execute a set, or multiple sets, of instructions to perform one or more computer functions.

The disk drive unit 116 may include a computer-readable medium 122 in which one or more sets of instructions 124 such as software, can be embedded. Further, the instructions 124 may embody one or more of the methods or logic as described herein. In a particular embodiment, the instructions 124 may reside completely, or at least partially, within the main memory 104, the static memory 106, and/or within the processor 102 during execution by the information handling system 100. The main memory 104 and the processor 102 also may include computer-readable media. The network interface device 120 can provide connectivity to a network 126, e.g., a wide area network (WAN), a local area network (LAN), or other network.

In an alternative embodiment, dedicated hardware implementations such as application specific integrated circuits, programmable logic arrays and other hardware devices can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

The present disclosure contemplates a computer-readable medium that includes instructions 124 or receives and executes instructions 124 responsive to a propagated signal, so that a device connected to a network 126 can communicate voice, video or data over the network 126. Further, the instructions 124 may be transmitted or received over the network 126 via the network interface device 120.

While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to store information received via carrier wave signals such as a signal communicated over a transmission medium. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

Although only a few exemplary embodiments have been described in detail above, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

What is claimed is:

1. A computer implemented method comprising:
    receiving a first Unified Extensible Firmware Interface (UEFI) device path at a UEFI driver included at a first information handling system, the device path corresponding to a device installed at the first information handling system, the UEFI driver including a table identifying a mapping between each respective member of a set of UEFI device paths and a corresponding member of a set of correlatable identifier strings;
    determining that the first UEFI device path is included in the set of UEFI device paths; and
    providing a first correlatable identifier string in response to the determining;
    wherein the first correlatable identifier provides a platform independent identifier for referring to the installed device, and
    wherein a driver included at a second information handling system includes a table identifying a mapping between a device path corresponding to a device installed at the second information handling system and the first correlatable identifier.

2. The method of claim 1 further comprising providing a displayable text string corresponding to the first UEFI device path and to the first correlatable identifier in response to the determining.

3. The method of claim 1 wherein the correlatable identifier string is a fully qualified device descriptor.

4. The method of claim 1 wherein the correlatable identifier string provides a reference to an object at an information handling system, the reference being platform-independent.

5. The method of claim 1 wherein receiving the first UEFI device path comprises receiving the first UEFI device path at an application programming interface (API), the API accessible by another UEFI driver.

6. The method of claim 1 wherein receiving the first UEFI device path comprises receiving the first UEFI device path at an application programming interface (API), the API accessible by a UEFI application.

7. The method of claim 1 wherein the UEFI driver is a UEFI boot services driver.

8. The method of claim 1 wherein the UEFI driver is a UEFI runtime services driver.

9. The method of claim 1 wherein the UEFI device path defines a logical location of an object at an information handling system, the UEFI device path being platform specific.

10. A computer implemented method comprising:
    receiving a first correlatable identifier string at a Unified Extensible Firmware Interface (UEFI) driver included at a first information handling system, the UEFI driver including a table identifying a mapping between each respective member of a set of device paths and a corresponding member of a set of correlatable identifiers strings;
    determining that the first correlatable identifier string is included in the set of correlatable identifier strings; and
    providing a first device path in response to the determining, the device path corresponding to a device installed at the first information handling system;
    wherein the first correlatable identifier provides a platform independent identifier for referring to the installed device, and wherein a UEFI driver included at a second information handling system includes a table identifying a mapping between a device path corresponding to a device installed at the second information handling system and the first correlatable identifier.

11. The method of claim 10 further comprising providing a displayable text string corresponding to the first device path and to the first correlatable identifier string in response to the determining.

12. The method of claim 10 wherein the correlatable identifier string is a fully qualified device descriptor.

13. The method of claim 10 wherein the correlatable identifier string provides a reference to an object at an information handling system, the reference being platform-independent, and wherein the UEFI device path defines a logical location of an object at an information handling system, the UEFI device path being platform specific.

14. The method of claim 10 wherein receiving the first correlatable identifier string comprises receiving the correlatable identifier string at an application programming interface (API), the API accessible by a UEFI driver or a UEFI application.

15. An information handling system comprising:
a memory; and
a processor coupled to the memory for executing instructions stored in the memory, the instructions executable by the processor to:
provide a firmware management infrastructure including a database, the database identifying a correspondence between a first device path of a set of device paths and a first correlatable identifier string of a set of correlatable identifier strings, wherein the first device path represents a platform-specific reference to an object at the information handling system and the first correlatable identifier string represents a platform independent reference to the object; and
provide an application programming interface (API) to support access to the database by a first program;
wherein a UEFI driver included at a second information handling system includes a database identifying a mapping between a device path corresponding to a device installed at the second information handling system and the first correlatable identifier.

16. The system of claim 15 wherein the database further identifies a correspondence between a first displayable text string of a set of displayable text strings and the first device path.

17. The system of claim 15 wherein the firmware management infrastructure comprises a Unified Extensible Firmware Interface.

18. The system of claim 15 wherein the first correlatable identifier string is a fully qualified device descriptor.

19. The system of claim 15 wherein the database and the API are provided by a Unified Extensible Firmware Interface (UEFI) driver or by a UEFI application.

20. The system of claim 15 wherein the first device path is a Unified Extensible Firmware Interface device path.

* * * * *